United States Patent Office 3,370,016
Patented Feb. 20, 1968

3,370,016
PREPARATION OF DENSE THORIA AND SULFATE CONTAINING THORIA FROM AN AQUEOUS THORIUM NITRATE SOLUTION
Gifford G. Briggs, Cincinnati, Ohio, assignor to the United States of America as represented by the United States Atomic Energy Commission
No Drawing. Filed Feb. 24, 1967, Ser. No. 619,131
9 Claims. (Cl. 252—301.1)

ABSTRACT OF THE DISCLOSURE

A precipitation process for forming thoria from an aqueous solution of thorium nitrate characterized by the addition of ammonium hydroxide while simultaneously bubbling or sparging with carbon dioxide, or by the equivalent operation of adding ammonium carbonate or bicarbonate to the solution. A precipitate will form which can be recovered from the mother liquor and which can be converted to a thoria powder having particles approaching the theoretical density of thoria and a spectrum of particle sizes which include an appreciable percentage which lie in the millimeter size range.

Field of the invention

The present invention relates to a method for the preparation of thoria particles from an aqueous solution of thorium nitrate. More particularly, it relates to a method for producing high density thoria particles with a wide range of particle sizes such as is required to obtain a high density thoria mass by vibratory compaction.

Background of the invention

In order to produce compacts of thoria by vibratory compaction techniques approaching (i.e., in excess of 70%) theoretical density, the particles making up the compact must have a high density and a broad spectrum of particle size running from as low as −300 mesh to as much as about 2 millimeters. The problem has always been that millimeter size particles having high density could not be produced by powder production methods.

A breakthrough in this technology occurred with the development of the invention described in U.S. Patent 3,035,895, which relates to a process of preparing large, high density thorium oxide particles by steam denitration of thorium nitrate at a critical nitrate-to-water content, forming a sol of the resultant oxide, drying the sol to a gel, and then calcining the gel to a temperature of about 1150° C. The present invention is similar to the method described in this patent in that it utilizes an aqueous solution of thorium nitrate as the initial source of thoria to produce high density millimeter size thoria particles. It differs radically from the method of that patent in that it avoids the use of high temperature thermal denitration and reaches a gel-type oxide without the necessity of forming a stable sol. Instead a simple precipitation process under controlled conditions is employed to produce a thorium precipitate possessing good settling and filtration characteristics which, after appropriate treatment by conventional decanting and filtration techniques to eliminate soluble by-products, can be dried to large unfissured gel-type particles. The gel particles can then be calcined to remove volatile constituents and to convert the material to large grains of dense thorium oxide. By appropriate selection of the rate and temperature at which precipitation takes place, the particle size of the precipitate which determines its settling and filtration characteristics can be fairly precisely controlled.

It is accordingly an object of this invention to provide a method for the preparation of high density millimeter (or greater) size thoria particles. Another object is to provide a method for the production of thoria particles of the character described which are particularly suitable for fabricating high density compacts by means of vibratory compaction. Still another object of this invention is to convert aqueous solutions of thorium nitrate into a powdered thoria product suitable for forming densified compacts of thoria possessing high density. An ancillary object of this invention is to provide a densified thoria mass which can be readily dissolved even after extended exposure to the neutron flux of a going reactor.

When an aqueous solution of ammonium hydroxide is added to an aqueous solution of pure thorium nitrate, the product is normally a fine gelatinous precipitate which settles only with difficulty after long periods of standing. Such a precipitate cannot be easily separated from the mother liquor by simple decanting or filtration procedures. The precipitate cannot be easily freed from the soluble ammonium nitrate which is a by-product of the precipitation reaction.

Summary of the invention

The present invention is based on the discovery and recognition that if the precipitation of thorium nitrate by addition of ammonium hydroxide is accompanied by a simultaneous bubbling or sparging with carbon dioxide, or by the equivalent operation of adding ammonium carbonate or bicarbonate to the solution, a precipitate will form which can be recovered from the mother liquor and which can be converted to a thoria powder having particles approaching the theoretical density of thoria and a spectrum of particle sizes which include an appreciable percentage which lie in the millimeter size range.

*The feed solution.*—The process starts with pure aqueous thorium nitrate—nitric acid solution as is produced, for example, from a solvent extraction of thorium-bearing ores. The filtered and dried precipitate is essentially a thorium hydroxide gel in the form of glassy pieces ranging in size up to about one-half inch. Chemical composition of the gel is considered to be essentially thorium hydroxide in which at least a portion of the hydroxyl radicals are replaced by nitrate, carbonate, and other anions. Once a dried thorium hydroxide gel is formed, it can be sized by crushing, milling, and screening procedures to isolate the desired particle size fractions, and then fired at a temperature in the range 1100° C.–1300° C. to produce particles of thoria approaching theoretical density. With a proper size distribution of the particles ranging from millimeter to micron size, very high vibratorily compacted densities can be achieved. In this respect, the precipitated gel produced by the process of the present invention is analogous in physical characteristics to that prepared by the thermal denitration sol-gel process described in U.S. Patent 3,035,895. Both processes provide the fraction of low-porosity, dense particles needed in a vibratorily compacted thoria product. They differ in that the process steps do not depend on thermal denitration or sol formation.

The source of thorium nitrate needed to practice this invention usually comprises a thorium nitrate solution purified generally by solvent extraction techniques and usually containing free nitric acid. The thorium nitrate may also be supplied in the form of purified thorium nitrate hydrate crystals which may be dissolved in water. Such a solution is fed from a stored source into a stainless steel precipitator tank equipped with internal steam heating coils, a vigorous agitator, a sparger to introduce carbon dioxide gas, and a submerged aqueous ammonia distributor. The feed solution may contain from ∼130 to 600 grams of thorium per liter, and up to about 3 normal free nitric acid. Prior to actual precipitation, the feed solution should be adjusted to a thorium concentration of from 100–130 grams of thorium per liter. Feed solutions containing higher thorium concentrations require a longer precipitation time in order to reach the desired coarseness of precipitate. The feed solution is accordingly diluted as necessary with a calculated quantity of deionized water to reach the preferred range of concentration of thorium in solution. At the same time, heating of the solution up to a temperature of about 200° F. should be begun while metering aqueous ammonia solution at a molarity of about 7.5 molar into the feed batch.

*Two-stage ammonia addition*

(1) *The neutralization stage.*—Ammonia is added to the solution in two stages. In the first stage, the amount of ammonia added is sufficient to neutralize all the free nitric acid present and to react partially with the thorium. During this stage, the ammonia can be added rather rapidly to the agitated solution while it is being heated to the desired temperature, but not so rapidly as to produce an excessive buildup of an initially formed transitory precipitate. This initial precipitate tends to form light "snowballs" that float on the surface unless agitation is intense. These snow-ball-shaped precipitates will redissolve on agitation to leave a clear solution. The initial precipitate is caused by production of local high pH conditions at the points of ammonia introduction into the solution. When the "snowballs" move into surrounding liquor having a pH of less than about 3, they redissolve.

(2) *The precipitation stage.*—In the second or precipitation stage, ammonia is added much more slowly to the agitated solution at constant temperature. At the same time, carbon dioxide gas is introduced through a submerged sparging device. The quantity of ammonia introduced during this final stage will be about 1.6 moles per mole of thorium present. The ammonia and carbon dioxide are added over a period ranging normally from 70 to 90 minutes until the precipitation is complete and the pH of the slurry as measured at 25° C. reaches about 4.5. If the pH greatly exceeds this value, then there is a tendency that the final precipitate will not possess the desired properties which lead to high shrinkage during calcination such as are necessary to produce thorium oxide particles of very high density.

The second phase of ammonia addition accompanied by carbon dioxide sparging is characterized by the gradual formation of a precipitate initiated by a gradual hazing of the solution as the initial permanent solid phase appears. The carbon dioxide appears to perform the function of inducing early nucleation of particles which then undergo growth as the precipitation proceeds. The precipitation of the permanent solid phase is thus drawn out over a wider range of pH change, and the result is that the final precipitate will have satisfactory settling and filtration characteristics. The startling and uniquely surprising effect of the carbon dioxide can be illustrated by a comparison of the precipitate produced in its absence. When ammonium hydroxide is added in the absence of carbon dioxide under the same conditions of rate, temperature, and the same final pH, the early nucleation does not take place, but the precipitation occurs with extreme suddenness as the final pH end point is approached. Insufficient time is available for particle growth, and the final precipitate will be extremely fine or gelatinous in nature. It will not settle sufficiently rapidly in the mother liquor nor exhibit desirable rapid filtration characteristics. It should be noted that, in the second stage of ammonia addition, a premixture of an aqueous solution of ammonium hydroxide and $CO_2$ will be effective to induce precipitation of a readily filterable thorium hydroxide precipitate. The separate addition of these reagents, however, is more convenient and allows for more discrete control during the course of precipitation.

For better control of the process, it is necessary to predetermine to a high degree of accuracy the total ammonia requirement for the precipitation reaction. This is done as follows:

Using a pH meter, a small volumetric sample of the thorium nitrate feed solution, which may contain excess nitric acid, is diluted in water and titrated at room temperature (25° C.) with a standardized solution of ammonium hydroxide until the pH reaches 5.7. A calculation then determines the ratio of ammonia in gram moles required in the titration to the number of milliliters of titrated thorium nitrate feed soluion. The total ammonia requirement for the process reactions expressed in moles per unit volume of thorium nitrate feed solution is then related to the calculated ratio from the titration by a constant factor determined by experience. It has been observed that the titration requirement of ammonia is somewhat less than the process requirement for ammonia per unit volume of thorium feed solution. Since the total quantity of thorium entering each precipitation batch will be known together with the analysis of the feed in terms of grams thorium per liter, the total volume of thorium feed solution will also be known. Then multiplication of the volume of thorium feed solution entering in each precipitation batch by the ammonia requirement per unit volume of feed solution will yield the total ammonia requirement for each precipitation batch. This method of determining the ammonia requirement has been found to be much more reliable than that based on analytical determinations of the thorium and free acid contents of the thorium feed solution. With the total ammonia requirement known, the portion expressed in moles to be added during the precipitation period is estimated closely as equal to 1.6 times the number of moles of thorium present. The remainder of the calculated total ammonia requirement is added during the first phase of ammonia addition.

The above method developed for preestimating the total ammonia requirement of the precipitation with a high degree of accuracy is desirable for the following reasons. First, during the second period of ammonia addition, the ammonium hydroxide solution of accurately known molarity is fed into the process solution at a constant rate and such that the final end point pH of 4.5 will be reached as nearly as possible in a preselected length of time after starting the addition. This selected time interval will normally be from 70 to 90 minutes. If the actual quantity of ammonia added during the second period to reach a pH of 4.5 is much greater than the calculated amount, the precipitated thorium hydroxide may be too coarse to yield the desired gel properties required for preparing dense granular thoria. On the other hand, if the actual ammonia requirement to reach a pH of 4.5 is much less than the calculated amount, the precipitate may be overly fine so that it settles and filters too slowly. If the calculated and actual ammonia requirements of the precipitation period coincide closely, then the precipitate will possess the desired qualities required for good settling and filtration rates and yet will be sufficiently fine in particle size to yield a satisfactory gel on being dried.

Second, during the precipitation period, the carbon dioxide gas is fed in at a carefully controlled preset constant rate. This rate is adjusted to be such as to introduce a selected total weight of carbon dioxide to the precipitation batch by the time that the pH reaches 4.5. If the precipitation period is drawn out much beyond the selected time, more $CO_2$ will be introduced and this will tend to promote an overly coarse precipitate. If the precipitation time is too short, less than the desired carbon dioxide will be introduced, and this will tend to produce too fine a precipitate.

The quantity of $CO_2$ introduced during the period of slow ammonia addition will be determined by factors which affect the degree of absorption of $CO_2$ into the liquid phase, and hence the degree of early nucleation of a precipitate, including temperature of the solution, intenseness of agitation, agitation pattern, depth of submergence of the sparging device, number of openings in the sparging device, the size of these openings, and any other factors which determine the size of the rising gas bubbles. The carbon dioxide usage will generally be less than .03 pound per pound of thorium. Most of the carbon dioxide will escape from the surface of the agitated solution, but a small amount is taken up in the precipitated thorium hydroxide.

Adverting now to the simultaneous ammonia-carbon dioxide precipitation reaction, as the pH rises above 3 (as measured at 25° C.), it will be noted that the bulk of the thorium precipitates and the resultant slurry whitens rapidly. At the end of the reaction, the final viscosity for a slurry containing about 100 grams thorium per liter should be about twice that of water. The resultant hot slurry will then exhibit a settling rate of approximately 10–16 inches per hour.

The control of precipitation rate affords a reliable way of controlling the particle size, and hence the crystallite size, of the final thoria. If the addition of the ammonium hydroxide is too rapid or if too little carbon dioxide is bubbled in, a thick gelatinous precipitate will result which will greatly increase the agitator power required for stirring and produce a very slow-settling, bulky, hydrous material. A precipitation time of approximately 80 minutes will result in an easily stirred slurry resembling heavy cream that settles and filters well and can be dried rapidly at 400° F., shrinking to translucent gel particles with particle sizes ranging up to one-half inch. This dried gel can then be rapidly heated to a temperature in the range of 1100° C.–1300° C. to produce granular dense thoria up to as high as 99.5% theoretical density suitable for densification by vibratory compaction techniques.

If the time of addition of ammonia and $CO_2$ is unduly extended, a fine, granular precipitate is obtained, and the viscosity of the resultant slurry is reduced. This material will filter very rapidly and, on drying, form a fine, white crystalline powder of good density which can be converted to thoria powder on heating above approximately 500° C. While the particle size of this powder is unsuitable for densification by virbratory compaction, it may nevertheless be useful for other purposes where less dense thoria is desired. It may be used, for example, as a starting material for forming extrusions or pressings to produce thoria shapes having a desired geometry after suitable high-temperature sintering.

An important variable in the precipitation process is temperature control during the final stage of addition of the ammonium carbonate (ammonium hydroxide plus carbon dioxide) when nucleation is taking place and as the bulk of the precipitate is forming. Variation of the temperature over a relatively small range has a marked effect on the type of precipitate produced. To prepare a gel-type precipitate with good settling and filtration characteristics, the temperature during precipitation should be controlled between 195° F. and 205° F. At a temperature of 190° F. and lower, the tendency is to produce too fine and hydrous a precipitate, and the settling and filtration rates may be unduly slow. A convenient temperature for carrying out the reaction is 200° F. Higher temperatures are avoided to lessen the rate of evaporation of water and to avoid loss of $CO_2$ due to lowered solubility of the gas in the solution. Boiling conditions are avoided because of excessive evaporation and to prevent the formation of excessive foam which may become troublesome during the period of most rapid precipitation.

The dried precipitate should appear as a translucent, glassy gel as opposed to a powder or an opaque-white, porous type of cake. Calcination of the translucent, yellowish, glassy gel will yield satisfactorily dense thoria particles, an appreciable portion of which fall within the millimeter size range. On the other hand, if the precipitation is conducted in such a manner as to produce a slurry exhibiting a settling rate above about 16 inches per hour, then the resulting filter cake will not yield directly on drying the desired glassy gel but will dry instead to an opaque-white, porous type of cake which will not calcine to extremely high-density thorium oxide granules.

In the event that the process does yield a precipitate that exhibits a settling rate exceeding about 16 inches per hour, as measured in the hot slurry, it has been found that a glassy gel structure still can be produced by introducing an additional processing step. Precipitates exhibiting settling rates up to at least 22 inches per hour can be converted to translucent gel if the filter cake is stirred or pugged briefly to a paste before being dried. During this process, the stiff air-blown filter cake is converted to a somewhat fluid, sticky paste.

*Treatment of the precipitated phase*

(A) *Gel formation.*—After the required amount of ammonia and carbon dioxide feed has been added and precipitation is complete, agitation and heating are discontinued. The milky white slurry is allowed to settle and cool. After settling, the supernatant liquid which contains most of the soluble by-product ammonium nitrate and traces of thorium should be removed. This is most easily accomplished by decanting the liquor through a filter press to remove the small amount of insoluble thorium. The settled precipitate should then be slurried in deionized water at ambient temperature (25° C. to 40° C.) with vigorous agitation until the slurry concentration reaches about 50 to 100 grams thorium per liter. When this is done, the thorium hydroxide which contains some nitrate and carbonate ions within its structure will become slightly hydrolyzed and peptized. A small amount of thorium re-enters the solution. Because of the hydrolysis, and presumably because of the replacement of nitrate anions in the precipitate with hydroxyl groups, the pH will be observed to fall from 4.5 to about 3.9. At this stage, the solids will no longer settle completely if agitation is stopped, and filtration would be very slow. At this point, restoration of a desirably high pH in the range of 5.4 to 5.6 measured at 30° C. (or 5.5 to 5.7 measured at 25° C.) is effected by the addition of a small amount of aqueous ammonia. This will restore the good settling and filtration properties of the slurry. It is important that the pH not be adjusted much above 5.7 (25° C.) because of the danger of producing an undesirable opaque-white, porous type of dried filter cake versus the desirable translucent, glassy, dried gel.

The reasons for repulping the settled precipitate are to render the solids in a suitably dilute suspension for pumping to a filter press, to dissolve away additional ammonium nitrate from the precipitate, and to permit readjustment of the final pH to rather narrow limits.

The thin, milky slurry having a pH of no more than about 5.7 (measured at 25° C.) is now filtered such as in a plate-and-frame press using paper filter media over a porous backing. The initial filtrate should be recirculated until it is clear. The resultant filter cake is then blown with air in the press to squeeze as much water from the cake as possible. The cake should not be washed with water in the press, because this will cause adverse peptization and loss of solubilized thorium. Washing with ammoniated water is inadvisable, because it would be practically impossible to maintain the precise pH conditions within the filter at all points. The wet cake thorium hydroxide now resembles "Ivory" soap in color and texture. It is now dried to remove moisture. During drying, temperatures as high as at least 400° F. may be employed with drying times at least as short as 100 minutes. Under these conditions, rapid shrinkage to coarse gel particles results without adverse surface checking of the particles. The volume of wet filter cake filling the press per ton of contained thorium will be about 38 cubic feet. About 0.9 pound of water will be evaporated during drying per pound of contained thorium. When the gel dried at temperatures much above 250° F. is cooled with exposure to air containing moisture, there is a tendency to re-absorb slowly a small amount of moisture. As a result, the gel fragments will tend to explode into smaller fragments. This "popcorn" effect is lessened greatly if the gel is allowed to cool slowly in the dryer prior to its removal. Of course, if the dried, hot gel can be transferred quickly to closed containers, the "popcorn" effect can be obviated. The "popcorn" effect is not particularly harmful, because the mean particle size of the gel fragments is not greatly reduced, and normally some size reduction of either the dried gel or of the final calcined thorium oxide will be necessary to meet particle size specifications for useful end products. The main objection is that the exploding fragments of gel will tend to fly considerable distances and thus constitute a potential health hazard, particularly if the gel is left uncovered in working areas for any appreciable length of time. Such a condition may arise when unloading trays from a dryer.

A necessary condition in drying the gel is that the as-is or pugged cake should not be agitated or tumbled. Thus, drying of the material in a dryer of the rotary type would result in the formation of small aggregated porous particles which would not be suitable for calcination to high density thoria. Dryers in which the wet cake is not agitated during the removal of moisture are required. This would include tray or shelf dryers, tunnel dryers, or, most preferably, a perforated, moving-belt, continuous dryer.

(B) *Treatment of the dried gel.*—The dried thorium hydroxide gel is now in condition to be converted to a compaction grade of thoria; i.e., a mixture of thorium oxide particles of various sizes selected such that, on vibration or jolting of the mixture, a minimum void volume between the particles will result. The individual particles themselves should preferably be free of cracks and large open or closed pores such that the particle density approaches the theoretical density of the thorium oxide lattice. In general, it is desirable when producing a compaction grade of thoria that the oxide be rendered available in a wide range of particle size from perhaps as coarse as that which would just pass a six-mesh to the inch sieve size to that which would just pass a 325-mesh to the inch sieve size.

The dried gel is converted to dense thorium oxide granules by heating to calcination temperatures in the range of 1100° C.–1300° C. During this process, some fracturing of the gel into smaller particles will take place and, as the temperature rises to about 500° C., volatile matter consisting of water vapor, carbon dioxide, and nitrogen oxides will be driven off. With gel dried at about 230° F., a weight loss of about 13% will result. About 10% weight reduction occurs when gel dried at 400° F. is calcined. Particle densities approaching at least 99% of theoretical can be achieved.

Once thoria particles covering a wide spectrum of particle size and of near theoretical density have been produced, the thoria may be processed by methods well known in the state of the art to produce mixtures of particles which will pack to bulk densities exceeding at least 7.2 grams per cubic centimeter. In general, this will entail crushing and grinding of some or all of the calcined oxide particles and screening operations to separate out certain particle sizes. Various amounts of these fractions may then be combined to yield the final desired mixture which will meet a specified bulk density on being compacted by vibratory or other mechanical means. To attain the very highest packing densities, it is usually desirable to eliminate oxide particles lying within certain particle size ranges. The particular particle size spectrum which will yield the desired packing density is usually determined on an empirical basis. It is, of course, desirable to achieve the desired final particle mixture with a minimum loss of thoria lying within incompatible ranges of particle size. It may also be desirable to perform all or a portion of the grinding and sieving operations on the unfired dried gel particles rather than on the calcined oxide, since the grinding energy required and erosiveness of the weaker, softer, gel particles would be much less. By way of example, a final thoria product having a packing density of about 7.6 grams per cubic centimeter was prepared as follows. Dried gel thorium hydroxide was screened and crushed to obtain 54.9% of the material in a size range lying between 6 and 10 mesh. The remainder of the gel was crushed and sieved repeatedly until all passed an 80-mesh screen. The two gel fractions were then calcined at 1200° C. in air for a period of two hours at temperature. The two fractions were then combined. The bulk density was determined after hand-jolting the powder in a glass cylinder two inches in diameter. In this example, utilization of the original gel was 100% and no attempt was made to separate certain size fractions of particles which should yield even higher packed densities.

The dried gel can be heated to the calcination temperature in times at least as short as three or four hours. While sintered densities as high as 99% of theoretical can be achieved at calcination temperatures as low as 900° C., the material may not be stable toward reaction with atmospheric moisture. When particles are sintered or calcined at 900° C. and cooled, the grains shatter as moisture is re-adsorbed. Therefore, a temperature of at least 1100° C. is required during calcination, not only to reach maximum particle density but also to stabilize the oxide against a tendency to re-adsorb water vapor. Very little decrepitation of the oxide calcined at 1100° C. is observed due to thermal shock when the oxide is cooled rapidly after removal from the furnace. All of the particles assume a white, glazed appearance after being calcined. The dried thorium hydroxide gel can also be employed as a starting material in preparing shaped thoria objects such as cylindrical pellets or flat cylindrical wafers. In this application, it will generally be necessary first to reduce the particle size of the gel by appropriate milling procedures to yield a relatively fine powder and then prefire the gel at temperatures in the range 500° C. to 700° C. to convert it to a thorium oxide containing little volatile matter. Alternatively, a procedure has been employed in which the gel particles are heated to about 700° C. and then cooled; the thorium oxide then decrepitates as moisture is adsorbed from the air to produce a material of smaller particle size. This oxide may then be further reduced in particle size by appropriate milling procedures. The thoria powders thus produced may then be mixed with small amounts of organic binders or lubricating agents and extruded or pressed to form shaped articles. After prefiring at temperatures sufficient to volatilize the additives, the thoria articles may then be sintered at temperatures as high as 1700° C. to achieve maximum density. Higher calcining temperatures are required in preparing such shaped articles than are necessary in preparing loose compaction-grade powders, because the individual grains must be accreted together by recrystallization of the thoria.

*Addition of sulfate to produce a dissolvable thoria*

An important consideration in preparing dense thoria for use as fertile targets in a nuclear reactor for the production of the fissionable isotope Uranium-233 is that the oxide must be fairly readily dissolvable in suitable dissolution agents after removal from the nuclear reactor. Normally, extremely pure dense thoria exhibits a very low rate of dissolution in strong mineral acids. In practice, a suitable dissolution agent is prepared from 12.5 molar nitric acid made 0.025 molar in fluoride ion and 0.10 molar in aluminum. The thoria is dissolved in this reagent under refluxing, boiling conditions with bottom heating of the vessel and intense agitation. In a dissolution test, 0.10 gram mole of thorium oxide is added to 100 milliliters of the dissolution agent. The time required for dissolution of the thoria will depend on the particle size of the thoria, with the smaller particles tending to dissolve most rapidly. However, to meet the requirements of a dissolution test, it is expected that particles as large as 6 mesh will be at least 95% dissolved in six hours. The dense thoria produced by the precipitation process described above will not always meet this requirement. It has been found, however, that a small addition of sulfate as ammonium sulfate to the precipitation batch will greatly improve the dissolution of high density thoria. Sulfate additions within the range from 1500 to 6000 parts per million parts of thorium are employed. The sulfate can be added at any stage in the process prior to carrying out the filtration step. For convenience, it has been the practice to add the ammonium sulfate, dissolved in a small quantity of water, during the repulping of the precipitated slurry and just before the final neutralization with ammonium hydroxide to a pH of 5.7. The sulfate has also been added just after the precipitation step and just before the agitation is stopped to permit the precipitate to settle. Addition of the sulfate at this point is advantageous in that it increases the rate of settling of the precipitate, presumably by coagulating the thorium hydroxide particles. During calcination of the gel to dense thorium hydroxide, much of the sulfate is removed by volatilization. Chemical analysis of the dense thoria indicates that the sulfate retained lies in the range from 300 to 500 parts per million parts of thorium, and the amount retained appears to be relatively independent of the quantity of sulfate added. As an example, a gel prepared with the addition of 6000 p.p.m. sulfate was calcined in air at 1200° C. for two hours, and was then crushed so that all of the particles just passed a 6-mesh screen. This thorium oxide was 96.0% dissolved in a time of three hours when refluxed in the above-described dissolution agent. Another portion of the same calcined oxide was crushed and sieved to obtain a fraction of material passing a 40-mesh screen. This −40 mesh thorium oxide was 96.6% dissolved in a time of 2.5 hours.

Having described the invention in general terms including an analysis of the important process parameters, a detailed representative embodiment of the invention as applied to the production of a thorium hydroxide gel useful in preparing densified compaction-grade thoria or as a starting material in the preparation of shaped thoria articles will be described.

In preparation for the process, solvent extracted thorium nitrate feed was analyzed as containing 477 grams thorium per liter and 1.81 molar in free nitric acid. A 3-milliliter pipetted sample of this feed solution in 150 milliliters of distilled water was then titrated at 25° C. with 33.47 milliliters of a 0.753 molar ammonium hydroxide solution to a pH end point of 5.70. Calculation then established that the 3.00 milliliters of thorium nitrate feed required .02519 gram mole of ammonia for neutralization in the titration. Since the scale of operation called for the precipitation of 130.1 pounds, or its equivalent, 59,000 grams of thorium, the total volume of thorium nitrate feed required was $59{,}000/477 = 123.7$ liters. The total ammonia requirement for the precipitation of this quantity of thorium was then estimated closely using the following relationship:

$$\frac{\text{Gram moles NH}_3 \text{ for batch}}{\text{Liters thorium nitrate for batch}} = K \frac{\text{Gram moles NH}_3 \text{ for titration}}{\text{Liters thorium nitrate titrated}}$$

where K is a constant of proportionality found previously by experience to be 1.119. Substituting numbers, $$\frac{\text{Gram moles NH}_3 \text{ for batch}}{123.7 \text{ liters}} = 1.119 \frac{.02519 \text{ gram mole NH}}{.00300 \text{ liter}}$$

Hence, the total ammonia required for the batch was estimated to be 1163 gram moles. The number of gram moles of thorium (atomic weight, 232) in the batch was to be 59,000/232 or 254.3. Multiplying this number by 1.6, the estimated quantity of ammonia to be fed during the precipitation period was found to be 407 gram moles. Subtraction of this number from the total ammonia requirement gave $1163 - 407 = 756$ gram moles, and this represents the quantity of ammonia to be fed during the first phase of rapid ammonia addition.

To start the process, 123.7 liters of the thorium nitrate solution were transferred to the precipitator vessel, and 322 liters of distilled water were added. At this point, the thorium concentration was about 133 grams per liter. Heating and vigorous agitation were then begun. At the same time, the first phase of ammonia addition was started using 7.50 molar ammonia hydroxide. After 53 minutes, all of the required 756 gram moles of ammonia were fed (100.8 liters), and the temperature had reached 198° F. After 56 minutes elapsed, the solution temperature was at 200° F. and was maintained constant at this value. At 60 minutes of elapsed time, the second slow stage of ammonia addition was started using 7.52 molar ammonium hydroxide. The rate of addition was carefully controlled such that the estimated requirement of 407 gram moles equivalent to 54.1 liters would be fed over a period of 80 minutes. At the same time, carbon dioxide gas was fed into the solution at a constant rate sufficient to deliver 2.3 pounds of $CO_2$ in the period of 80 minutes. Agitation intensity was maintained constant during this period. Ten or fifteen minutes after starting the second ammonia and $CO_2$ addition, a noticeable blue hazing of the solution was observed. As the run proceeded, the haze intensified gradually. Finally, the solution whitened rather rapidly, and precipitation was observed to be almost complete after 77 minutes had elapsed, and a test with pH paper indicated a pH near 4.5 had been reached. Feeding of ammonia and $CO_2$ was discontinued simultaneously. A sample of the slurry was taken, cooled to 25° C., and the pH was measured with an accurate pH meter. Additions of 7.5 molar ammonia were made until the pH at 25° C. measured by a pH meter reached 4.5. The total quantity of ammonia used in the precipitation was 1149 gram moles which is in good agreement with the prior estimate of 1163 gram moles. Heating and agitation were discontinued, and the slurry which now contained about 100 grams thorium per liter was permitted to settle. The settling rate was about one foot per hour. After settling, the supernatant liquor was decanted and pumped through a filter press to retain traces of insoluble thorium. Distilled (deionized) water was then added to the settled precipitate, and agitation was begun. At the same time, ammonium sulfate $(NH_4)_2SO_4$ in the amount of 487.2 grams was added to impart a level of 6000 p.p.m. $SO_4^=$ on a thorium basis. The sulfate was added after first dissolving it in a few liters of distilled water. After diluting the slurry to a concentration of 100 grams thorium per liter, the pH was readjusted to 5.70 (at 25° C.) by adding 1720 milliliters of 7.5 molar ammonium hydroxide. The slurry was then filtered on a plate-and-frame press. The filter was blown with compressed air to remove as much water from the cake as possible over a period of approximately one hour. The cake, which resembled "Ivory" soap in appearance, was then ready for drying. The firm white cake would normally dry directly to a translucent glassy gel structure. However, to insure greater uniformity of the product and, in part, to simulate the action of a continuous dryer feeding device where the cake may be squeezed through orifices onto a moving perforated belt, the cake was pugged or stirred briefly to form a paste in a Hobart bowl mixer. The paste, which was much more plastic than the air-blown filter cake, was of a toothpaste-like consistency. It was transferred into pans and dried in a tray dryer. The maximum temperature reached during the latter part of the drying period was 400° F. When dry, the resulting greenish, glassy gel particles ranged in size up to about one-half inch. Moisture loss during drying was about 0.90 pound per pound of contained thorium. The weight of the dried gel was about 1.25 pounds per pound of contained thorium.

A sample of the dried gel was calcined at 1200° C. in air for two hours. About 3.5 hours were required to heat the furnace to this temperature. The weight loss in calcining the dried gel to thorium oxide was about 9%. The final thorium oxide grains were opaque-white and glazed in appearance. The particle size distribution was as follows:

| Tyler mesh size: | Wt. percent |
|---|---|
| +6 | 22.9 |
| −6+10 | 57.0 |
| −10+16 | 16.7 |
| −16+20 | 0.3 |
| −20+40 | 2.1 |
| −40 | 1.0 |
| | 100.0 |

Density data for the above particles were obtained using a mercury porosimeter. The apparent density of the particles was 9.1 grams per cubic centimeter. The real density value was 9.3 grams per cubic centimeter at a mercury penetration pressure of 2.5 tons per square inch. Penetrated pore volume was .0027 cubic centimeter per gram of oxide at this mercury pressure. A density measurement based on water displacement by the particles gave a value of 9.35 grams per cubic centimeter.

The particles of the above oxide which were greater than 6 mesh were crushed until all passed the 6-mesh sieve. This material was then recombined with the −6 mesh fractions and the particle size distribution of the mixture was now as follows:

| Tyler mesh size: | Wt. percent |
|---|---|
| −6+10 | 72.9 |
| −10+16 | 22.4 |
| −16+20 | 0.5 |
| −20+40 | 2.8 |
| −40 | 1.4 |
| | 100.0 |

A dissolution test was made with the above −6 mesh oxide. A 26.4-gram sample of the oxide was refluxed in 100 milliliters of 12.5 molar nitric acid made 0.025 molar in fluoride and 0.10 molar in aluminum. The sample was 98.6% dissolved in 3.5 hours.

To demonstrate that a powder mixture of thoria could be produced which would easily exceed a density of 7.2 grams per cubic centimeter, the following was done: The dried gel was sieved to recover 55% of the material in a size range between 6 and 10 mesh. The remaining portion was crushed and sieved repeatedly until all of it passed an 80-mesh screen. The two fractions of gel were then calcined at 1200° C. for two hours. The resulting oxide particles were then recombined and mixed by tumbling. The mixture was found to have a density of 7.5 grams per cubic centimeter after jolting the material in a glass cylinder which was two inches in diameter. The following particle size distribution was determined by sieving:

| Tyler mesh size: | Wt. percent |
|---|---|
| −6+10 | 16.5 |
| −10+16 | 30.0 |
| −16+20 | 1.2 |
| −20+40 | 6.1 |
| −40+80 | 1.3 |
| −80+100 | 0 |
| −100+150 | 8.4 |
| −150+200 | 6.7 |
| −200+250 | 2.8 |
| −250+325 | 5.5 |
| −325 | 21.5 |
| | 100.0 |

The invention described herein was made in the course of, or under, a contract with the U.S. Atomic Energy Commission.

Having thus described my invention, I claim:

1. A method for effecting preparation of thoria from an aqueous solution of thorium nitrate which comprises adding aqueous ammonia and carbon dioxide to said solution at an elevated temperature until the Ph of said solution reaches a value of 4.5.

2. The process according to claim 1 in which precipitation is conducted at a temperature in the range 195–200° F.

3. The process according to claim 1 in which the settling rate of the precipitate is in the range 10–22 inches per hour.

4. The process according to claim 1 in which the thorium nitrate solution contains from 100 to 130 grams thorium per liter.

5. A method for preparing densified thoria particles which comprises adding a mixture of aqueous ammonia and $CO_2$ to a hot aqueous solution of thorium nitrate until the pH, as measured at 25° C., reaches a value of 4.5, separating the resultant precipitant from supernatant solution, forming an aqueous slurry of the precipitate, adjusting the pH of the slurry to a pH no greater than about 5.7 (as measured at 25° C.), filtering the slurry to produce a filter cake, drying the filter cake to produce a gel and then calcining the dried gel.

6. The process according to claim 5 in which sufficient sulfate is introduced in the stage between precipitation of the thorium nitrate and filtration of the slurry at a concentration which renders the final calcined product dissolvable.

7. The process according to claim 5 in which the temperature of precipitation is in the range 195–200° F.

8. The process according to claim 5 in which the temperature of calcination is in the range 1100–1300° C.

9. The process according to claim 5 in which the settling rate of the slurried precipitate is from 10 to 22 inches per hour.

References Cited

UNITED STATES PATENTS 3,082,103    3/1963    Wainer.

CARL D. QUARFORTH, *Primary Examiner.*

BENJAMIN R. PADGETT, *Examiner.*

S. J. LECHERT, Jr., *Assistant Examiner.*